Figure 1:
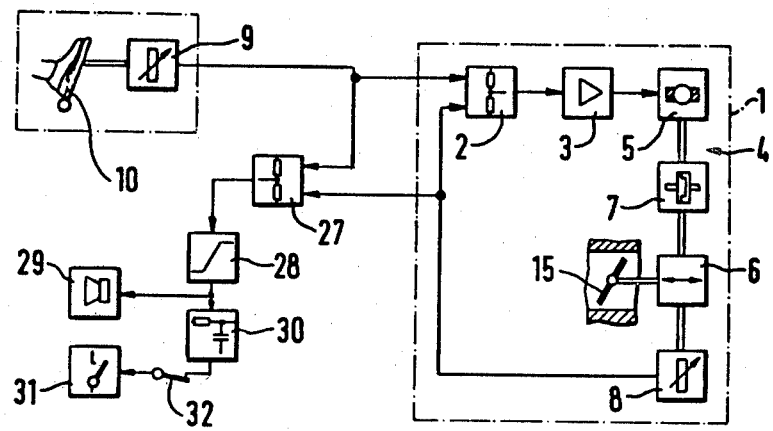

United States Patent [19]

Mann et al.

[11] 4,393,833

[45] Jul. 19, 1983

[54] DEVICE FOR THE CONTROL OF THE TRAVELING SPEED OF A MOTOR VEHICLE

[75] Inventors: Arnold Mann, Bieber; Harald Collonia, Königstein, both of Fed. Rep. of Germany

[73] Assignee: VDO Adolf Schindling AG, Frankfurt am Main, Fed. Rep. of Germany

[21] Appl. No.: 291,531

[22] Filed: Aug. 10, 1981

Related U.S. Application Data

[62] Division of Ser. No. 86,828, Oct. 22, 1979, Pat. No. 4,313,408, which is a division of Ser. No. 894,371, Apr. 7, 1978, abandoned.

[30] Foreign Application Priority Data

| Dec. 2, 1977 [DE] | Fed. Rep. of Germany | 2753702 |
| Dec. 2, 1977 [DE] | Fed. Rep. of Germany | 2753703 |
| Dec. 9, 1977 [DE] | Fed. Rep. of Germany | 2754826 |

[51] Int. Cl.$^3$ ............................................ F02D 11/10
[52] U.S. Cl. ............................. 123/335; 123/397; 123/399; 180/271
[58] Field of Search ............... 123/397, 399, 335, 359, 123/340; 180/271, 272, 281, 282

[56] References Cited

U.S. PATENT DOCUMENTS

| 3,699,935 | 10/1972 | Adler | 123/359 |
| 3,973,539 | 8/1976 | Jones | 123/359 |
| 4,112,885 | 9/1978 | Iwata | 123/399 |
| 4,120,373 | 10/1978 | Fleischer | 123/399 |
| 4,319,658 | 3/1982 | Collonia | 123/361 |

*Primary Examiner*—Ronald B. Cox
*Attorney, Agent, or Firm*—Martin A. Farber

[57] ABSTRACT

A device for the control of the traveling speed of a motor vehicle with a regulating unit actuatable by the vehicle driver, particularly a gas pedal, and means for transmission of the movement of the same to an element, particularly the throttle valve, which influences the fuel-air mixture. An electrical controller is provided, the desired value input of which is applied with the output signal of a first electrical position indicator, the latter being coupled with the regulating unit and the actual value input of which is applied with the output signal of a second electrical position indicator, the latter being coupled with the setting member or positioning actuator of an electrical setting or adjusting device, the actuator standing in connection with the element which influences the air-fuel mixture. Measures are provided which compensate for abnormal speed conditions of the device.

5 Claims, 1 Drawing Figure

DEVICE FOR THE CONTROL OF THE TRAVELING SPEED OF A MOTOR VEHICLE

This is a Division of application Ser. No. 86,828, filed Oct. 22, 1979, now U.S. Pat. No. 4,313,408, Ser. No. 86,828, in turn, is a divisional application of parent application Ser. No. 894,371, filed Apr. 7, 1978, now abandoned.

The invention relates to a device for the control of the traveling speed of a motor vehicle with a regulating unit actuateable by the vehicle driver, particularly a gas pedal, and means for transmission of the movement of the same to an element, particularly the throttle valve, which influences the fuel-air mixture.

With known devices of this type the gas pedal is located in the vehicle space, the gas pedal being connected with the throttle valve in the motor space either by means of a Bowden cable or by means of rods. Particularly with trucks by which the gas pedal and throttle valve generally are arranged with a larger distance from one another, this led to comparatively high displacement or regulating forces on the gas pedal, which can be avoided to a certain extent only by careful laying of the Bowden cable or by a special construction of the rods. Beyond that such type of devices have a construction which is disadvantageous in assembly or installation and maintenance.

The invention cooperates with an electrical controller (1), the desired value input of which is applied with the output signal of a first electrical position encoder or indicator (9), the latter being coupled with the regulating unit (10) and the actual value input of which is applied with the output signal of a second electrical position encoder or indicator (8), the latter being coupled with the setting member or positioning actuator (6) of an electrical setting or adjusting device (4), the actuator (4) standing in connection with the element (15) which influences the air-fuel mixture.

Upon a breakdown or failure of the device, in order to guarantee that the throttle valve does not pivot into a full or open throttle position, or remain in this position with an adjusting device with a servomotor standing in connection with the positioning actuator carrier via an electrically actuateable coupling device, according to a further concept of the invention, means are provided which inoperatively switch or disconnect the coupling device (7) upon a deviation of the actual value from the desired value at the controller (1) remaining after expiration of the response time. Since the servomotor pivots the throttle valve out from its rest position against the force of a spring, by decoupling of the servomotor (5) from the positioning actuator carrier, the throttle valve (15) is pivoted back by the spring into its rest position, whereby the motor falls back to its idling rotational speed.

Under circumstances it can occur that, for example with a freezing or icing of the suction or intake system, the throttle valve can be pulled back into its rest position from its pivoted position by the spring engaging thereon, so that an undesired abnormal action or behavior of the motor can result. Such a type of abnormal operating condition indeed can occur also with the known devices by which the gas pedal is connected via a Bowden cable or via rods with the throttle valve, however there the possibility exists, to be able to move the throttle valve back again into its rest position by drawing out the gas pedal.

With the previously mentioned measures for stopping of an abnormal action or behavior it is necessary that the servomotor produces a certain minimum moment of rotation, with which the throttle valve can be moved back into its starting position. If the icing is too intense or if the rods which are provided between the throttle valve and the servomotor are jammed or if indeed the coupling device between the servomotor and the rods is not in order, thus return movement of the throttle valve into its starting position by the motor is not possible. Particularly if the throttle valve locks or sticks in its open or full throttle position or in a position adjacent this position, dangerous traffic situations can result which under circumstances indeed can lead to a traffic accident.

This can be avoided in the manner that means (27, 28, 31) are provided which upon a diviation of the output signal of the second position encoder (8) from that of the first position encoder (9) by a certain predetermined amount, the ignition circuit of the motor vehicle is interrupted.

In this manner it is guaranteed that with a locking or catching of the throttle valve in a position outside of its rest position, the ignition circuit of the motor vehicle is interrupted; the drive system of the motor vehicle thus is placed out of operation. Dangerous traffic situations thereby can no longer occur as a result of a locked or struck throttle valve.

It has proven advantageous when the means contains an optical and/or acoustic warning device (29), which can be operatively switched timewise prior to the interruption of the ignition circuit. In this manner the dirver is informed of the inoperativeness of the drive system of his motor vehicle which is constrained to occur shortly after that, and consequently the driver still can take corresponding proper traffic measures, such as pulling over to the right street side. On the same basis it has proven advantageous to provide a manually operable switch (32) for inoperatively switching (disconnecting) the means. Thereby the possibility exists to be able to again place the drive system in operation after a provided emergency shut-down of the drive system, in order, for example, to move the motor vehicle away from a danger zone.

According to an advantageous embodiment, the means comprises a comparator (27) to which on the one hand the output signal of the second position encoder is fed and on the other hand the output of the first position encoder is fed, and a threshold value switch (28) is connected thereafter to the comparator (27), which switch (28) directly or indirectly, for example via a relay, switches or controls the ignition circuit.

With the above and other objects and advantages in view, the present invention will become more clearly understood in connection with the following detailed description of preferred embodiments, when considered with the accompanying drawings, of which:

FIG. 1 is a block circuit diagram of a device with means for interrupting the ignition current circuit during deviation of the position encoder output signals.

The device according to FIG. 1 contains an electrical controller 1, which essentially comprises a comparator 2, an amplifier 3 connected following the latter in series and a setting or adjusting device 4, the latter comprising an electrical servomotor 5, a setting member or positioning actuator 6 (i.e., a regulating unit) and an electromatic coupling or clutch 7 connected therebetween.

The controller 1 in addition contains a setting transmitter or position encoder 8 which is connected with the actuator 6 and transmits to one input of the comparator 2 a voltage proportional to the prevailing position of the position encoder 8. On the other input of the comparator 2, which for example is constructed of a series connection of two resistors which are applied at their free ends with the signals to be compared and the ends of which are connected with one another to form the comparator output, there lies the position encoder 9, the latter being formed as a variable resistor and coupled with the gas pedal 10 of the motor vehicle. The position encoder 9 which delivers a voltage signal which is dependent on the prevailing position of the gas pedal 10 and is directly connected to the comparator 2.

For explanation of the manner of operation of the device, let us start out for example with the gas pedal 10 located in its rest position and the motor rotating with its idling rotational speed. The throttle valve 15 is located in its idling position and the comparator 2 is applied with a signal at its input, which corresponds to the prevailing equilibrium at the controller 1 and the stage which is disposed between the latter and the gas pedal. If the gas pedal 10 is now pivoted about a certain angle by the driver, the position encoder 9 supplies a higher voltage signal to the comparator 2, the latter thereby triggering or driving the servomotor 5. The motor pivots the throttle valve 15 via the positioning or setting actuator 6 in the sense of an increase in the rotational speed. The position change of the setting actuator 6 results in a change of the output signal of the position encoder or setting transmitter 8, whereby the voltage increases at the other input of the comparator 2. This leads to a renewed equilibrium condition in which the throttle valve 15 is pivoted by a value corresponding to the gas pedal pivoting and the motor has a rotational speed corresponding to the gas pedal pivoting 10.

For explanation of the manner of operation of the device, be it assumed that we start out from the condition in which the gas pedal 10 is pivoted by a certain amount from its rest position and consequently the position encoder 9 sends a signal to the comparator 2 of the controller 1, which signal corresponds to this pivoting angle. Consequently also the throttle valve 15 is pivoted and indeed by a value corresponding to the angle of pivoting of the gas pedal. The motor thus rotates with a certain rotational speed.

The position encoder 9 and the position encoder 8 are connected to the two inputs of a comparator 27, the output of which stands in connection with a threshold value switch 28. The output of the threshold value switch 28 on the one hand is connected to an acoustical alarm or warning device 29 and on the other hand is connected to a switching stage 31 via a timing or time delay circuit 30, the switching element of the switching stage 31 being disposed in the ignition circuit.

For explanation of the manner of operation of this device be it assumed that we start out where the gas pedal 10 is pivoted from its rest position and consequently also the throttle valve 15 is pivoted by a corresponding angle. The signals which appear at the inputs of the comparator 2 and of the comparator 27 are consequently equal and the output signal of the comparator 27 is such that the threshold value switch 28 is not switched or operated. If the driver now removes his foot from the gas pedal 10, thus this returns into its rest position. If the simultaneous resetting or return of the throttle valve 15 now were prevented in the manner that the suction or intake system is covered with ice, then the signal which is emitted from the position encoder 8 does not change. Consequently at the comparator 27, between the signal coming from the position encoder 8 and that which comes from the position encoder 9, a signal difference arises wherein the comparator 27 drives the threshold value switch 28. The acoustic warning device 29 is activated and after a time delay of several seconds, the time delay being provided by the timing stage 30, the ignition circuit of the motor is turned off via the stage 31. If between the stage 30 and the stage 31 a switch 32 is present, then by means of this normally closed switch, the stage 31 can be switched inoperative, i.e. turned off, and consequently the drive system of the motor vehicle can be placed in operation.

While there has been disclosed an embodiment of the invention, it is to be understood that this embodiment is given by example only and not in a limiting sense.

I claim:

1. A device for the control of the traveling speed of a motor vehicle with a regulating unit actuatable by the vehicle driver, particularly a gas pedal, and means for transmission of the movement of the same to an element, particularly the throttle valve, which influences the fuel-air mixture, comprising a regulating unit,
   a first electrical position encoder being coupled with said regulating unit, said first position encoder having an output with an output signal,
   means for influencing the air-fuel mixture of the vehicle,
   an electrical adjusting device including a positioning actuator, the latter being connected with said means,
   a second electrical position encoder being coupled with said positioning actuator, said second electrical position encoder having an output with an output signal,
   an electrical controller including said electrical adjusting device and having a desired value input connected with the output of said first electrical position encoder and having an actual value input connected with the output of said second electrical position encoder, and wherein
   the vehicle includes an ignition circuit, the device further comprising
   means for interrupting the ignition circuit of the motor vehicle upon a deviation of the output signal of said second electrical position encoder from the output signal of said first electrical position encoder by a certain predetermined amount.

2. The device according to claim 1, wherein
   said interrupting means includes an optical and/or acoustical warning device, and
   means for operatively switching said warning device timewise prior to the interruption of the ignition circuit.

3. The device according to claim 1, further comprising
   a manually operable switch means for inoperatively switching said interrupting means.

4. The device according to claim 1, wherein
   said interrupting means comprises,
   a comparator,
   a threshold value switch connected to and following the latter,
   said threshold value switch is operatively connected to the ignition circuit.

5. A device for the control of the traveling speed of a motor vehicle with a regulating unit actuatable by the vehicle driver and including a throttle valve comprising:
a feedback loop responsive to an actuation by the driver for positioning the throttle valve, said loop including a motorized drive for moving said vehicle, an encoder for sensing the position of said valve, and a comparator for comparing a signal of said encoder with a signal from said driver, and
an alarm circuit comprising a comparator coupled to said encoder and responsive to said signal of said driver, a timer, and an alarm responsive to said timer and said comparator for signaling a failure of said throttle valve to return to a position directed by said signal of said driver.

* * * * *

UNITED STATES PATENT AND TRADEMARK OFFICE
CERTIFICATE OF CORRECTION

PATENT NO. : 4,393,833
DATED : July 19, 1983
INVENTOR(S) : Harald Collonia

It is certified that error appears in the above—identified patent and that said Letters Patent are hereby corrected as shown below:

Item [75] should read --Inventor: Harald Collonia, Königstein, Fed. Rep. of Germany--

Signed and Sealed this

Twenty-fifth Day of October 1983

[SEAL]

Attest:

GERALD J. MOSSINGHOFF

Attesting Officer

Commissioner of Patents and Trademarks